(12) United States Patent
Kim et al.

(10) Patent No.: US 7,528,914 B2
(45) Date of Patent: May 5, 2009

(54) VERTICAL ALIGNMENT MODE REFLECTIVE-TRANSMISSIVE LIQUID CRYSTAL DISPLAY WITH MULTI CELL GAP

(75) Inventors: Jae-Hyun Kim, Seoul (KR); Won-Sang Park, Yongin-si (KR); Sang-Woo Kim, Suwon-si (KR); Jae-Young Lee, Seoul (KR); Sung-Eun Cha, Geojae-si (KR); Jae-Ik Lim, Chuncheon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 334 days.

(21) Appl. No.: 10/995,474

(22) Filed: Nov. 24, 2004

(65) Prior Publication Data
US 2005/0134771 A1 Jun. 23, 2005

(30) Foreign Application Priority Data
Nov. 27, 2003 (KR) ............... 10-2003-0085174

(51) Int. Cl.
*G02F 1/1335* (2006.01)
*G02F 1/1337* (2006.01)

(52) U.S. Cl. .................... 349/119; 349/129
(58) Field of Classification Search ........ 349/114, 349/117–119, 96–98, 129
See application file for complete search history.

(56) References Cited

U.S. PATENT DOCUMENTS

| | | | |
|---|---|---|---|
| 5,557,434 A | * | 9/1996 | Winker et al. ............... 349/117 |
| 6,341,002 B1 | | 1/2002 | Shimizu et al. |
| 6,762,811 B2 | * | 7/2004 | Sasaki et al. ............... 349/118 |
| 6,801,283 B2 | * | 10/2004 | Koyama et al. ............ 349/119 |
| 6,829,025 B2 | * | 12/2004 | Sakamoto ................... 349/114 |

FOREIGN PATENT DOCUMENTS

| | | |
|---|---|---|
| CN | 1102712 A | 5/1995 |
| WO | WO 03/085940 | 10/2003 |

* cited by examiner

*Primary Examiner*—Dung T. Nguyen
(74) *Attorney, Agent, or Firm*—F. Chau & Associates, LLC.

(57) ABSTRACT

A vertical alignment mode reflective-transmissive liquid crystal display (LCD) includes the first substrate having an upper surface and a lower surface and the second substrate having an upper surface and a lower surface and facing the first substrate. A cell is formed between the upper surface of the first substrate and the lower surface of the second substrate. The cell has a plurality cell-gaps. A vertically aligned liquid crystal layer is disposed in the cell. The reflective region of the LCD has a cell-gap ranging from about 1.8 µm to about 2.2 µm, and the transmissive region of the LCD has a cell-gap ranging from about 3.6 µm to about 4.0 µm. The first optical film assembly including the first polarizer is disposed on the lower surface of the first substrate. The second optical film assembly including the second polarizer is disposed on the upper surface of the second substrate. An absorption axis of the first polarizer is substantially perpendicular to that of the second polarizer.

18 Claims, 13 Drawing Sheets

VERTICAL ALIGNMENT MODE REFLECTIVE-TRANSMISSIVE LIQUID CRYSTAL DISPLAY WITH MULTI CELL GAP

CROSS-REFERENCE TO RELATED APPLICATION

This application claims priority to and the benefit of Korean Patent Application No. 2003-0085174, filed Nov. 27, 2003, the disclosure of which is incorporated herein by reference in its entirety.

BACKGROUND OF THE INVENTION

1. Field of the Invention

The invention relates to a liquid crystal display (LCD), particularly to a reflective-transmissive LCD device exhibiting improved display characteristics.

2. Discussion of the Related Art

A reflective-transmissive LCD displays images by using the light from an internal light source (e.g., backlight) in a transmissive mode and an external light source (e.g., ambient light) in a reflective mode.

The optical condition of the transmissive-reflective type LCD apparatus is determined by the reflection mode so that the transmission mode of the optical condition is designed with respect to a black color. Therefore, a light transmittance of the transmission mode of the transmissive-reflective type LCD apparatus is decreased so that the light transmittance of the transmission mode of the transmissive-reflective type LCD apparatus may be a half of that of the transmissive type LCD apparatus.

To solve this problem, a "multi cell-gap" transmissive-reflective LCD device has been introduced.

BRIEF SUMMARY OF THE INVENTION

The present invention provides a liquid crystal display (LCD) having a reflective region and a transmissive region. The LCD includes the first substrate having an upper surface and a lower surface and the second substrate having an upper surface and a lower surface and facing the first substrate. A cell is formed between the upper surface of the first substrate and the lower surface of the second substrate. The cell has a plurality of cell-gaps. A vertically aligned liquid crystal layer is disposed in the cell. The reflective region of the LCD has a cell-gap ranged from about 1.8 µm to about 2.2 µm, and the transmissive region of the LCD has a cell-gap ranged from about 3.6 µm to about 4.0 µm. The first optical film assembly including the first polarizer is disposed on the lower surface of the first substrate. The second optical film assembly including the second polarizer is disposed on the upper surface of the second substrate. An absorption axis of the first polarizer is substantially perpendicular to that of the second polarizer.

Additional features and advantages of the invention will be set forth in the description which follows, and in part will be apparent from the description, or may be learned by practice of the invention. The features and other advantages of the invention will be realized and attained by the structure particularly pointed out in the written description and claims hereof as well as the appended drawings.

BRIEF DESCRIPTION OF THE DRAWINGS

The accompanying drawings are included to provide further understanding of the invention and are incorporated in and constitute a part of this specification.

DETAILED DESCRIPTION OF THE EXEMPLARY EMBODIMENTS

Figure 1:
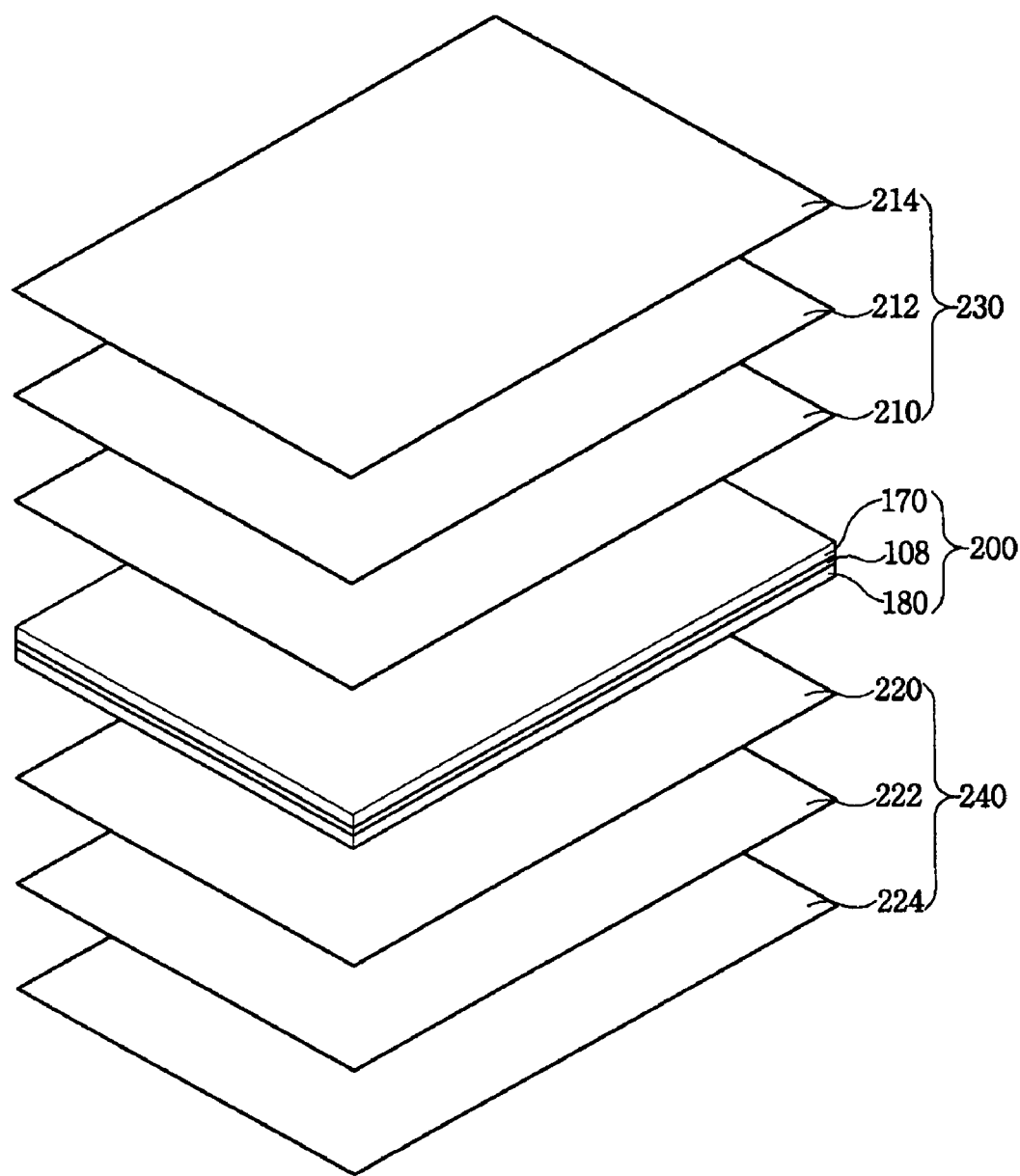
FIG. 1 is an exploded perspective view showing an LCD apparatus according to an embodiment of the invention.
Figure 2:
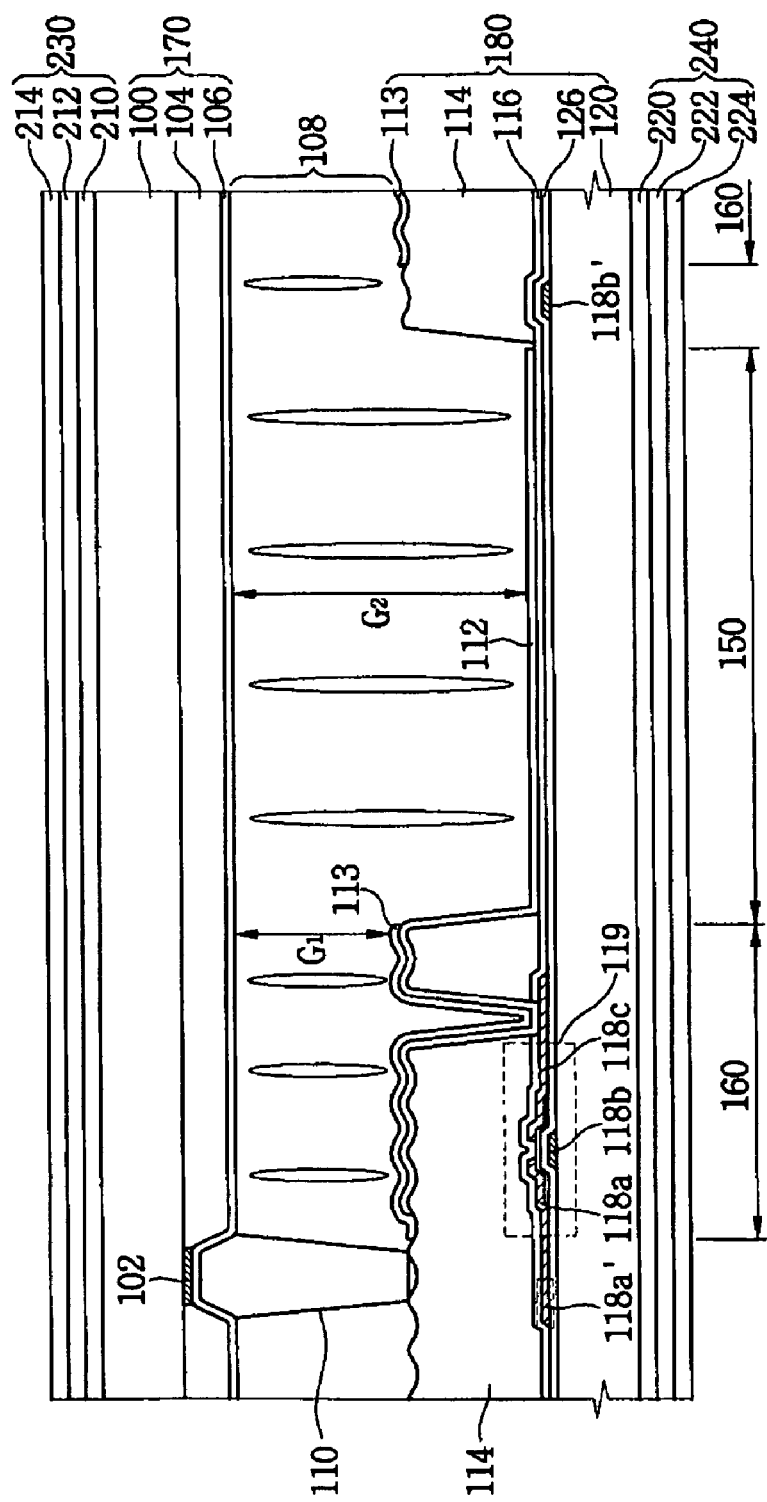
FIG. 2 is a cross-sectional view showing an LCD of FIG. 1.

FIG. 1 is an exploded perspective view showing a reflective-transmissive LCD with a vertically aligned liquid crystal layer according to an embodiment of the invention. FIG. 2 is a cross-sectional view showing the reflective-transmissive LCD of FIG. 1. The LCD includes an LCD panel 200, an upper optical film assembly 230 and a lower optical film assembly 240. The LCD panel 200 includes a first substrate 170, a second substrate 180 and a liquid crystal layer 108. The first substrate 170 includes an upper plate 100, a black matrix 102, a color filter 104, a common electrode 106 and a spacer 110. The second substrate 180 includes a lower plate 120, a thin film transistor (TFT) 119, a gate insulating layer 126, a passivation layer 116, an organic layer 114, a transparent electrode 112 and a reflective electrode 113. The spacer 110 is formed between the first substrate 170 and the second substrate 180 to maintain a certain gap therebetween. The LCD panel 200 is divided into a transmissive region 150 and a reflective region 160. In the transmissive region 150, the light from a backlight assembly (not shown) passes through the LCD panel 200. In the reflective region 160, an external light provided to the LCD panel 200 is reflected.

The upper and lower plates 100 and 120 include a transparent glass. The black matrix 102 is disposed on the upper plate 100. The color filter 104 is formed on the upper plate 100, but may be disposed on the lower plate 120. The common electrode 106 is formed on the upper plate 100 and covers the color filter 104. The common electrode 106 may be formed of a transparent conductive material, but may be disposed on the lower plate 120.

The TFT 119 is formed on the lower substrate 120. The TFT includes a source electrode 118a, a gate electrode 118b, a drain electrode 118c and a semiconductor layer pattern. A data voltage generated from a driving integrated circuit (not shown) is applied to the source electrode 118a through a source line 118a'. A gate signal generated from the driving integrated circuit (not shown) is applied to the gate electrode 118b through a gate line 118b'. The storage capacitor (not shown) is formed on the lower plate 120 to maintain voltage difference between the common electrode 106 and the reflective electrode 113 or between the common electrode 106 and the transparent electrode 112.

The gate insulating layer 126 is disposed on the lower plate 120 to cover the gate electrode 118b and the gate line 118b'. A portion of the gate insulating layer 126 within the transmissive region 150 may be removed to increase transmittance of the transmissive region 150. The passivation layer 116 is disposed on the lower plate 120 to cover the TFT 119. An opening is formed through the passivation layer 116 to expose the drain electrode 118c. The organic layer 114 is disposed on the lower plate 120 to insulate the TFT 119 from the transparent electrode 112 and the reflective electrode 113. The organic layer 114 includes an opening window formed at the transmissive region 150 to expose a portion of the passivation layer 116 within the transmissive region 150.

The liquid crystal layer 108 occupies the space (i.e., cell) between the first substrate 170 and the second substrate 180. The distance between the first substrate 170 and the second substrate 180 is called a cell-gap. Due to various thicknesses of the organic layer 114, the reflective region 160 and the transmissive region 150 have different cell-gaps G1 and G2. The organic layer 114 planarizes the stepped portions of the lower plate 120 formed by the TFT 119, the source line 118a', the gate line 118b', etc.

The transmissive electrode 112 is disposed on the passivation layer 116 at the transmissive region 150, the organic layer 114 and the opening exposing the drain electrode 118c at the reflective region 160. The transmissive electrode 112 is electrically connected to the drain electrode 118c through the opening. A potential is formed between the transparent electrode 112 and the common electrode 106 to vary the transmittance of the liquid crystal layer 108. The reflective electrode 113 is disposed on the organic layer 114 at the reflective region 160. The reflective electrode 113 is formed of a conductive material and forms electrical contact with the drain electrode 118c through the transparent electrode 112.

The driving integrated circuit (not shown) applies the data voltage to the transparent electrode 112 and the reflective electrode 113 through the TFT 119 to form an electric field between the common electrode 106 and the transparent electrode 112 and between the common electrode 106 and the reflective electrode 113. As well known, a threshold voltage is a minimum potential difference between the common electrode 106 and the transparent and reflective electrodes 112 and 113 that is required to drive the liquid crystal. A saturation voltage is a potential difference therebetween that no longer substantially changes a twisted amount of the liquid crystal even when a potential greater than such a potential difference is applied.

An upper alignment layer (not shown) and a lower alignment layer (not shown) may be disposed on the first and second substrates 170 and 180, respectively. The upper and lower alignment layers are rubbed in certain directions to align the liquid crystal layer in the rubbing direction. The rubbing direction of the upper alignment layer is different (e.g., opposite) from the rubbing direction of the lower alignment layer. The liquid crystal in the liquid crystal layer 108 is vertically aligned with respect to the lower and upper plates 100 and 120 by using the upper and lower alignment layers.

The upper optical film assembly 230 includes an upper λ/4 retardation film 210, an upper λ/2 retardation film 212 and an upper polarizer 214. The lower optical film assembly 240 includes a lower λ/4 retardation film 220, a lower λ/2 retardation film 222 and a lower polarizer 224. An absorption axis of the upper polarizer 214 is substantially perpendicular to that of the lower polarizer 224 to operate the LCD in a normally black mode. That is, when no potential difference is formed between the common electrode 106 and the transparent and reflective electrodes 112 and 113, the LCD displays black, thereby decreasing light leakage and improving display quality.

Figure 3:
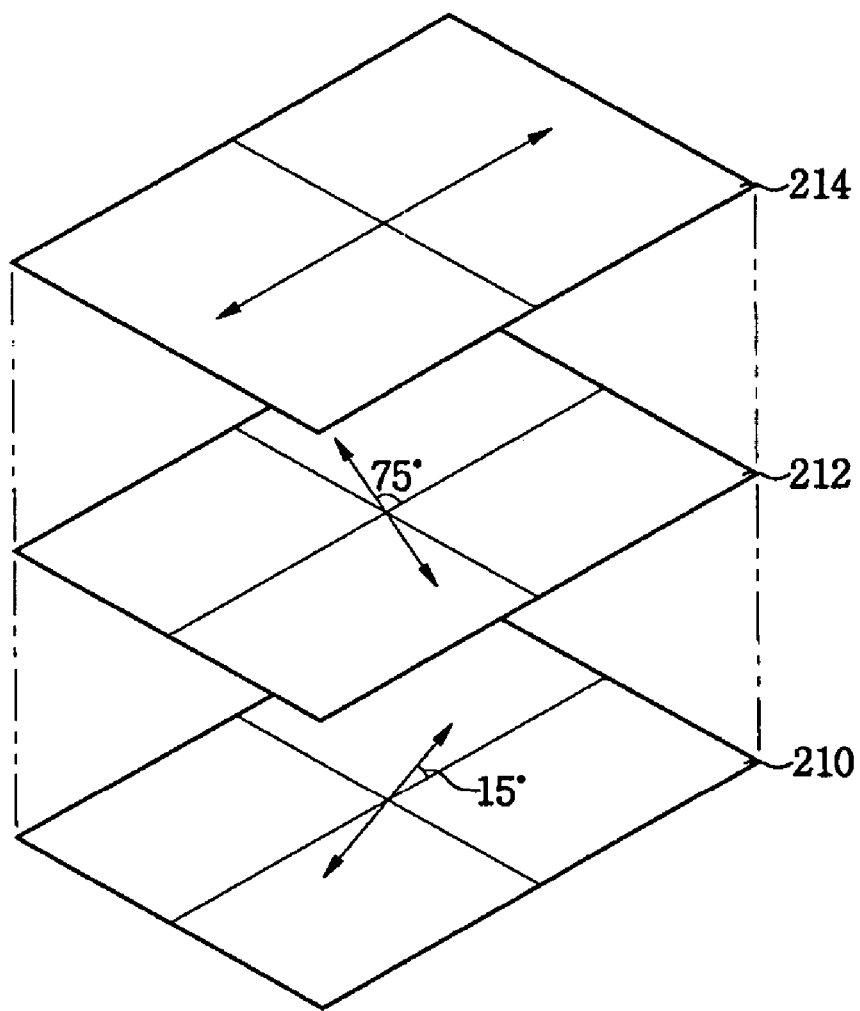
FIG. 3 is an exploded perspective view showing an upper optical film assembly of the LCD of FIG. 2.

FIG. 3 is an exploded perspective view showing the upper optical film assembly 230. The upper λ/4 retardation film 210 is disposed on the upper surface of the upper plate 100, of which the slow axis is slanted at an angle of 15° counter-clockwise with respect to the absorption axis of the upper polarizer 214. The slow axis of the upper λ/2 retardation film 212 is slanted at an angle of 75° counter-clockwise with respect to the absorption axis of the upper polarizer 214. In reference to a light having a wavelength of about 550 nm, Δnd (optical path difference) of the upper λ/4 retardation film 210 is ranged from about 130 nm to about 150 nm, preferably about 140 nm. And of the upper λ/2 retardation film 212 is ranged from about 265 nm to about 285 nm, preferably about 275 nm.

Figure 4:
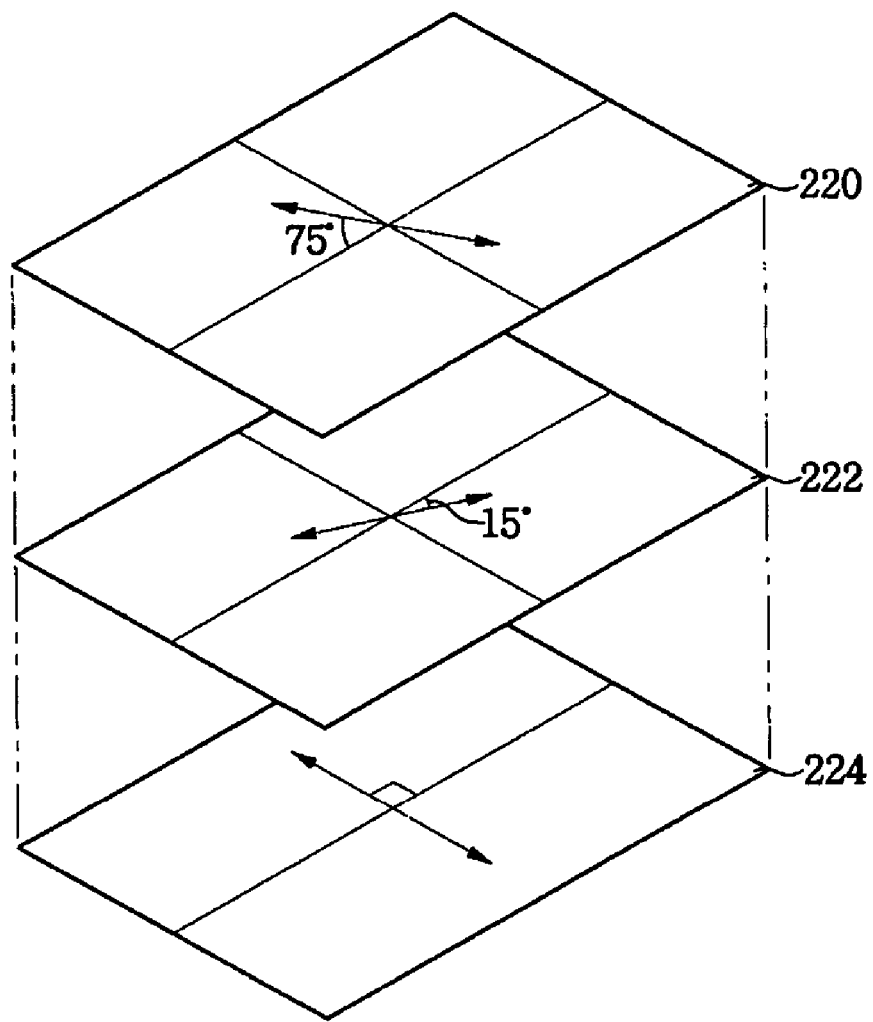
FIG. 4 is an exploded perspective view showing a lower optical film assembly of the LCD of FIG. 2.

FIG. 4 is an exploded perspective view showing a lower optical film assembly 240. The lower λ/4 retardation film 220 is disposed on the lower surface of the lower plate 120. An angle between the slow axes of the lower λ/4 retardation film 220 and the upper λ/4 retardation film 210 is ranged from about 80° to about 100°. The lower λ/2 retardation film 222 is disposed under the lower λ/4 retardation film 220. An angle between the slow axes of the lower λ/2 retardation film 222 and the upper λ/2 retardation film 212 is ranged from about 80° to about 100°. The slow axes of the lower λ/4 retardation film 220 and the upper λ/4 retardation film 210 are substantially perpendicular to each other, and the slow axes of the lower λ/2 retardation film 222 and the upper λ/2 retardation film 212 are substantially perpendicular to each other. In reference to a light having a wavelength of about 550 nm, Δnd of the lower λ/4 retardation film 220 is ranged from about 130 nm to about 150 nm, preferably 140 nm, and Δnd of the lower 80 /2 retardation film 222 is ranged from about 265 nm to about 285 nm, preferably 275 nm.

Figure 5:
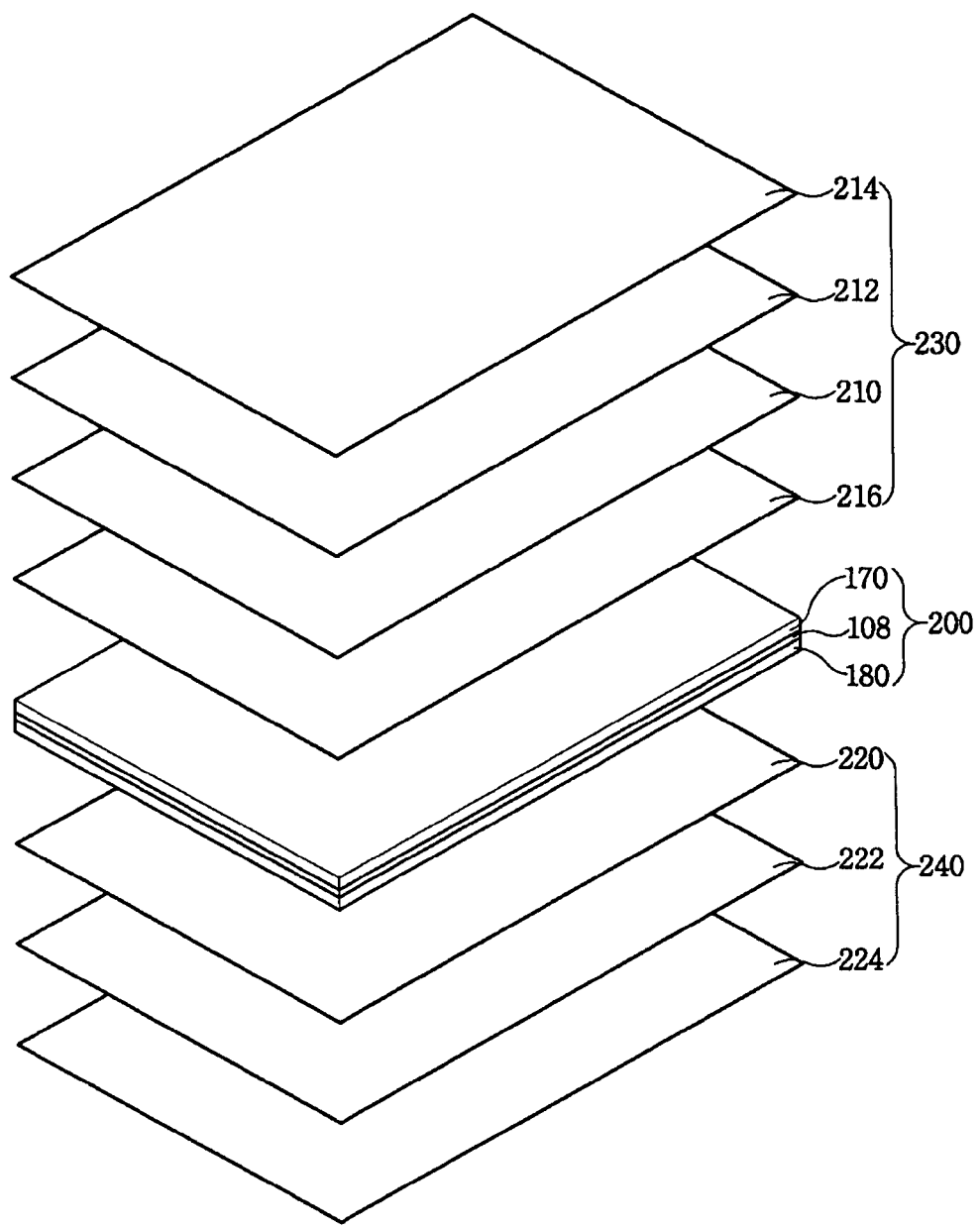
FIG. 5 is an exploded perspective view showing an LCD apparatus according to another embodiment of the invention.
Figure 6:
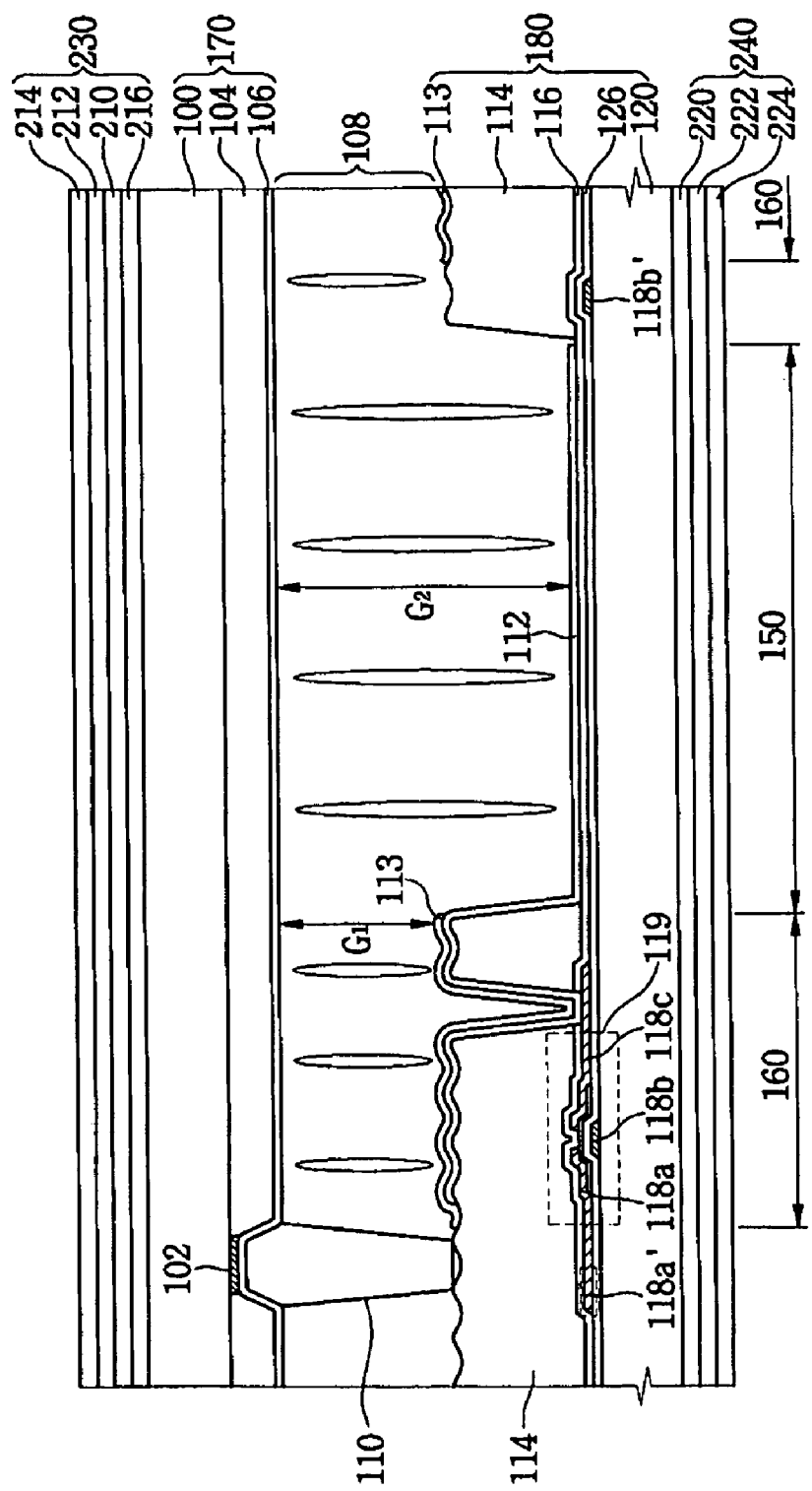
FIG. 6 is a cross-sectional view showing an LCD apparatus according to the LCD of FIG. 5.

FIG. 5 is an exploded perspective view showing a reflective-transmissive LCD with a vertically aligned liquid crystal layer according to another embodiment of the present invention. FIG. 6 is a cross-sectional view showing the LCD of FIG. 5. Due to optical anisotropy, display qualities of an LCD are determined by the viewing angle of an LCD. Generally, a viewing angle means an angle that allows an image to be seen with a minimum contrast ratio of about 10:1. The contrast ratio is a ratio between a bright point and a dark point in luminance. The contrast ratio can be improved by properly blocking a light and increasing luminance uniformity. Since the LCD of the present invention operates in the normally black mode, the contrast ratio is improved.

The LCD shown in FIGS. 5 and 6 is similar to the LCD shown in FIG. 1 and FIG. 2 except that the LCD of FIGS. 5 and 6 further includes a compensation film 216 to improve its viewing angle and luminance uniformity. The compensation film 216 may be an A-plate, a C-plate, etc. The A-plate and the C-plate are uniaxial films. The refractive index (nx) in x-direction of the A-plate is substantially equal to the refractive index (ny) in y-direction of the A-plate, and the refractive index (nz) in z-direction of the A-plate is more than the refractive index (nx) in the x-direction of the A-plate or the refractive index (ny) in the y-direction of the A-plate. The refractive index (nx) in x-direction of the C-plate is substantially equal to the refractive index (ny) in y-direction of the C-plate, and the refractive index (nz) in z-direction of the C-plate is less than the refractive index (nx) in the x-direction of the C-plate or the refractive index (ny) in the y-direction of the C-plate.

In the case that the compensation film 216 is a C-plate, the C-plate 216 is disposed between the upper substrate 100 and the λ/4 retardation film 210. The C-plate 216 improves luminance uniformity, thereby improving the viewing angle display quality in a direction not perpendicular to the surface of the LCD. The C-plate 216 is formed by coating and aligning cholesteric liquid crystal on an upper surface of the LCD panel 200 at a predetermined thickness. Subsequently, an ultraviolet (UV) ray is irradiated onto the aligned cholesteric liquid crystal to secure the aligned cholesteric liquid crystal. The upper optical film assembly 230 is formed on the C-plate 216. The lower optical film assembly 240 is formed on a lower face of the LCD panel 200.

Figure 7:
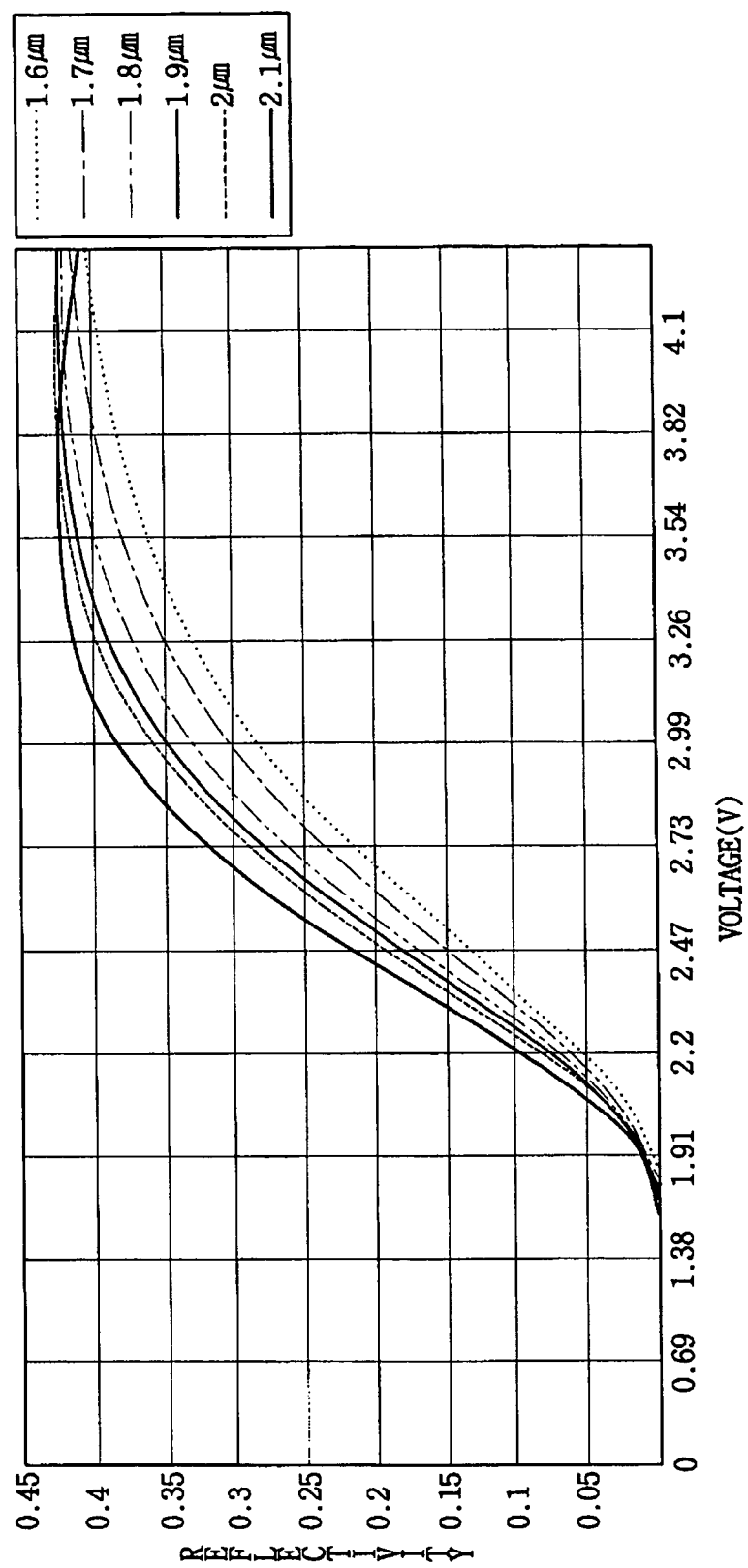
FIG. 7 is a graph showing reflectivity vs. voltage for various cell-gaps in the reflective region of the LCD of the embodiments of the invention.
Figure 8:
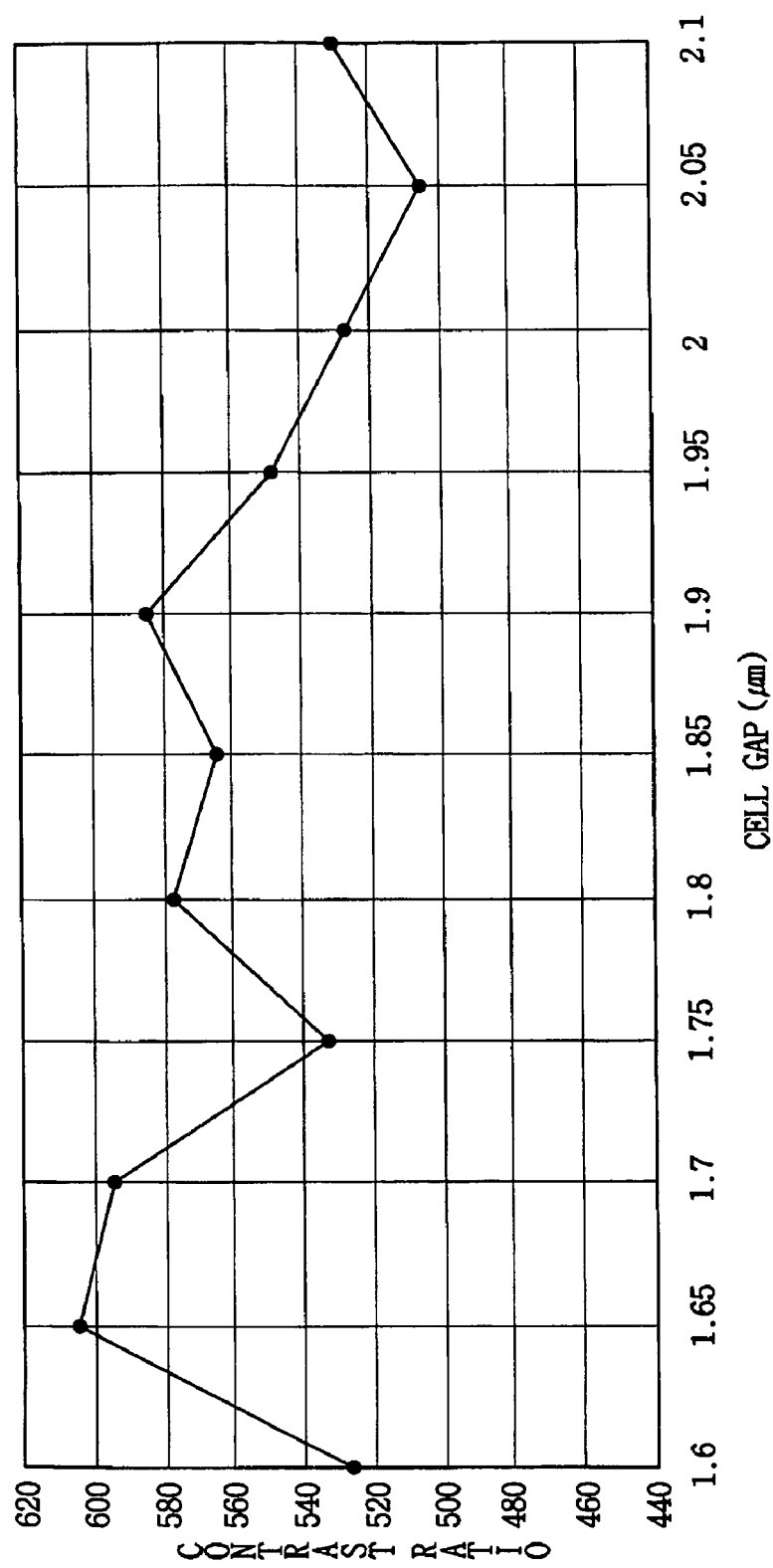
FIG. 8 is a graph showing contrast ratio vs. cell gap in the reflective region of the LCD of the embodiments of the invention.

With the LCD shown in FIGS. 1, 2, 5 and 6, an experiment was performed by using a Dimos Simulation Program manufactured by Autronic-MELCHERS GmbH in Germany. FIG. 7 is a graph showing reflectivity vs. voltage for various cell-gaps in the reflective region 160. The horizontal axis represents voltage (e.g., potential) applied between the common electrode 106 and the transparent and reflective electrodes 112 and 113. The vertical axis represents reflectivity of the LCD apparatus. FIG. 8 is a graph showing contrast ratio vs. cell gap in the reflective region 160. The horizontal axis represents cell-gap, and the vertical axis represents contrast ratio.

FIG. 7 indicates the LCD exhibits high reflectivity when the cell-gap G1 of the reflective region 160 is no less than 1.8 μm. When the voltage applied to the electrodes 106, 112 and 113 is no more than 3.82V, the reflectivity increases in proportion to the cell-gap G1. When the voltage applied to the electrodes 106, 112 and 113 is more than 3.82V, the reflectivity changes in response to the voltage and the cell-gap G1. The LCD shows the maximum reflectivity when the voltage is about 4V and the cell-gap G1 is about 2 μm. FIG. 8 shows the contrast ratio having a plurality of peaks. When the cell-gap G1 of the reflective region 160 is about 1.65 μm, the contrast ratio is about 603. When the cell-gap G1 is about 2 μm, the contrast ratio is about 527.

Figure 9:
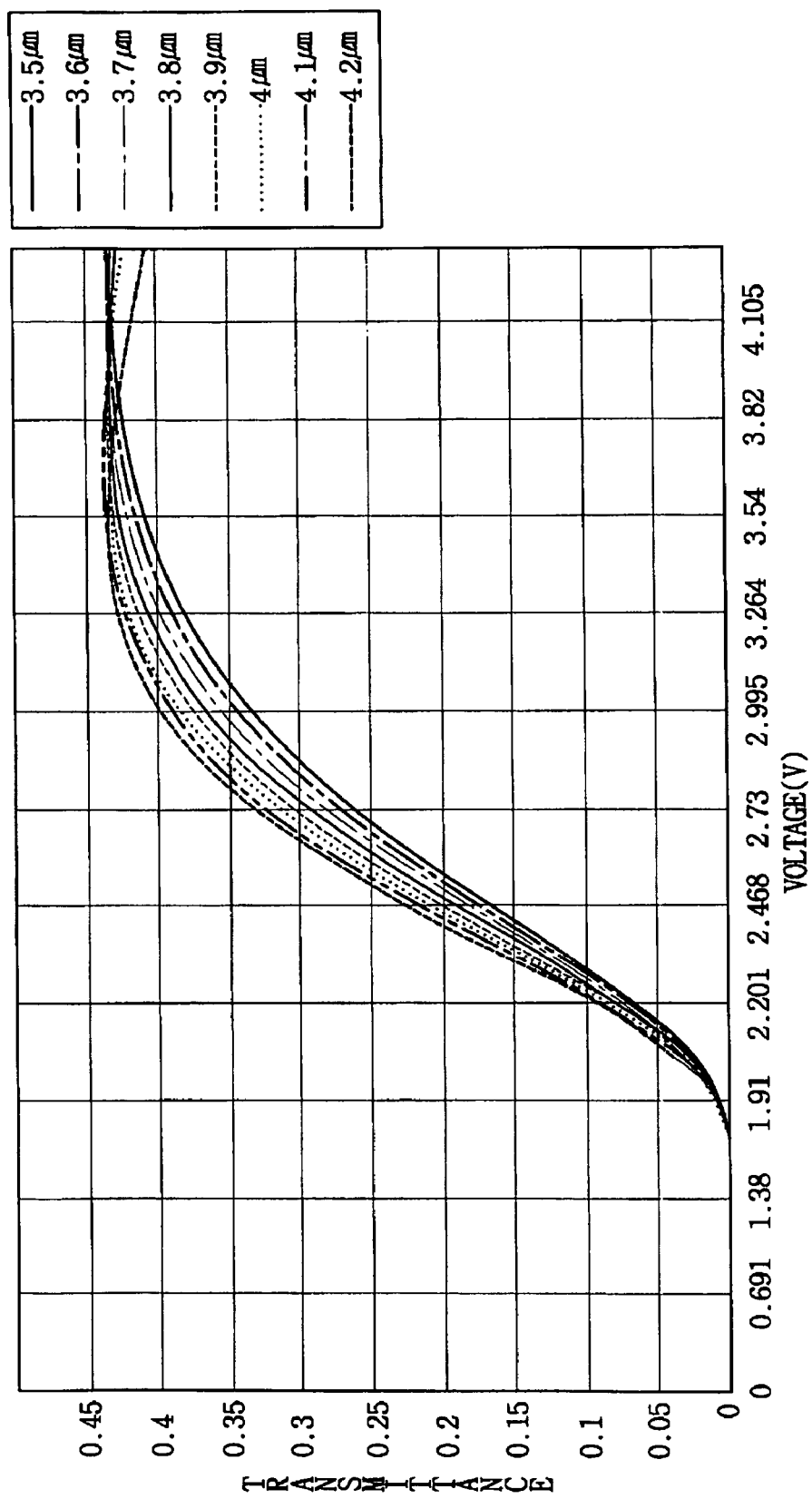
FIG. 9 is a graph showing transmittance vs. voltage for various cell-gaps in the transmissive region of the LCD of the embodiments of the invention.

FIG. 9 is a graph showing transmittance vs. voltage for various cell-gaps in the transmissive region 150. The horizontal axis represents voltage (i.e., potential) applied between the common electrode 106 and the transparent and reflective electrodes 112 and 113, and the vertical axis represents transmittance of the LCD. When the cell-gap G2 is no less than 3.6 μm, the LCD shows high transmittance. When the voltage V applied to the electrodes 106, 112 and 113 is no more than 3.7V, transmittance increases in proportion to the cell-gap G2. When the voltage V is more than 3.7V, the transmittance does not change substantially regardless of the cell-gap G2. When the voltage is about 4V and the cell-gap G2 is about 3.8 μm, the LCD shows the maximum transmittance.

Thus, according to an embodiment of the present invention, the LCD is structured to have the cell-gap G1 of the reflective region 160 ranging from about 1.8 μm to about 2.2 μm, preferably about 2 μm. The cell-gap G2 of the transmissive region 150 ranges from about 3.6 μm to about 4 μm, preferably about 3.8 μm. A ratio between G1 and G2 is preferably about 1:1.9. The threshold voltage is no more than about 2V, preferably about 1.7V, and a saturation voltage therebetween is no more than about 4.4V, preferably about 4V.

Figure 10:
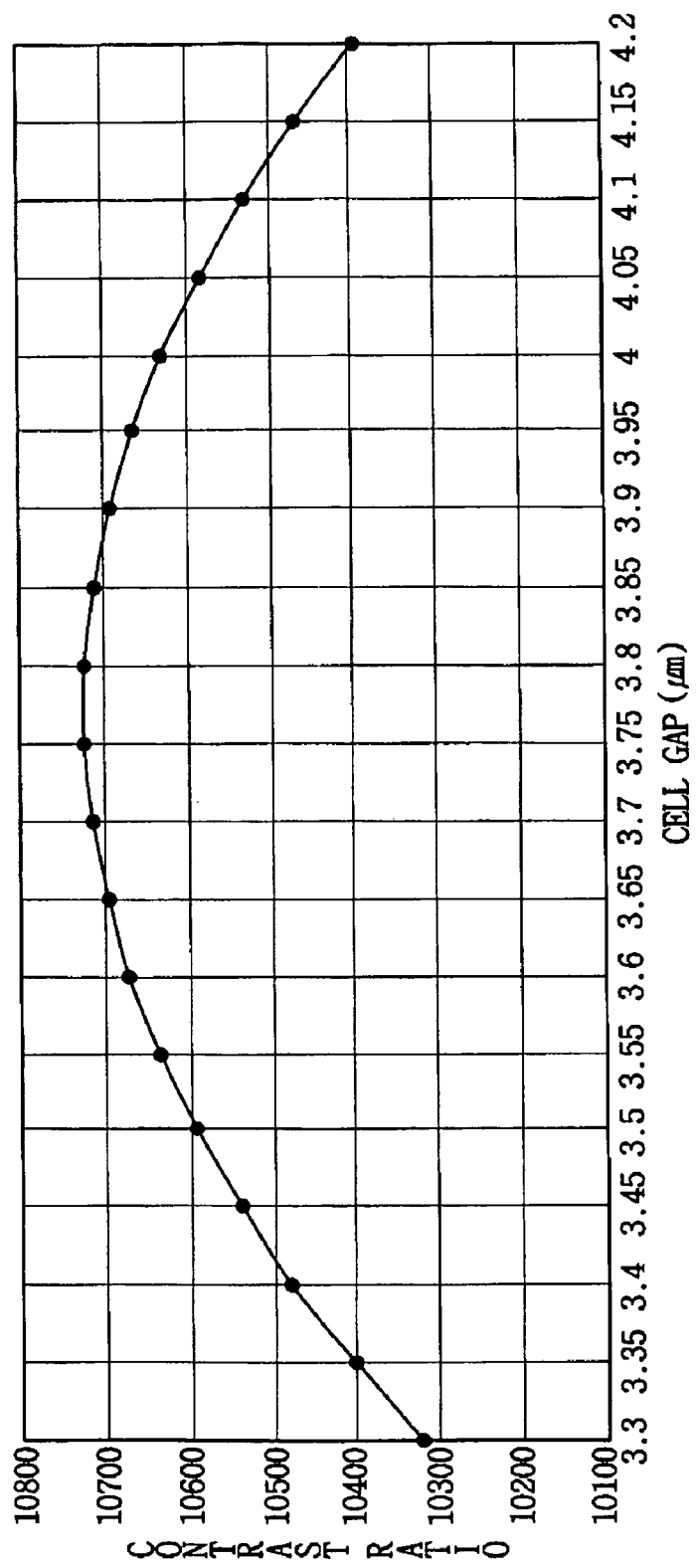
FIG. 10 is a graph showing contrast ratio vs. cell gap in the transmissive region of the LCD of the embodiments of the invention.

FIG. 10 is a graph showing contrast ratio vs. cell-gap in the transmissive region 150. The horizontal axis represents cell-gap G2 of the transmissive region 160 and the vertical axis represents contrast ratio. When the cell-gap G2 is about 3.8 μm, the contrast ratio is about 10720. As mentioned above, the optimized cell-gap G2 and the cell-gap G1 are about 3.8 μm and about 2 μm, respectively. In a homogeneously aligned liquid crystal layer, the optimized cell-gaps of the transmissive region and the reflective region are 3.3 μm and about 2 μm, respectively.

With this in mind, Table 1 shows comparison between the homogeneously aligned LCD and the vertically aligned LCD of the present invention in optical characteristics of the reflective regions (the cell-gap of the homogeneously aligned LCD is about 1.6 μm).

TABLE 1

| Reflective Mode | | | | | |
|---|---|---|---|---|---|
| White | Black | Contrast | Color Coordinates | | |
| (%) | (%) | Ratio | x | y | Liquid Crystal Layer |
| 8.8 | 0.26 | 33.7 | 0.3286 | 0.3625 | Homogeneously Aligned |
| 8.7 | 0.18 | 48.3 | 0.3161 | 0.3502 | Vertically Aligned |

Here, 'White (%)' refers to reflectivity while displaying white, 'Black (%)' refers to reflectivity while displaying black. A contrast ratio equals 'White (%)' divided by 'Black (%)' and, thus, proportional to 'White (%)' and inverse-proportional to 'Black (%)'. The contrast ratio of the vertically aligned LCD was 48.3 and the contrast ratio of the homogeneously aligned LCD was 33.7. Thus, the LCD of the present invention shows significant improvement in contrast ratio over the homogeneously aligned LCD by 43.3%.

Figure 11:
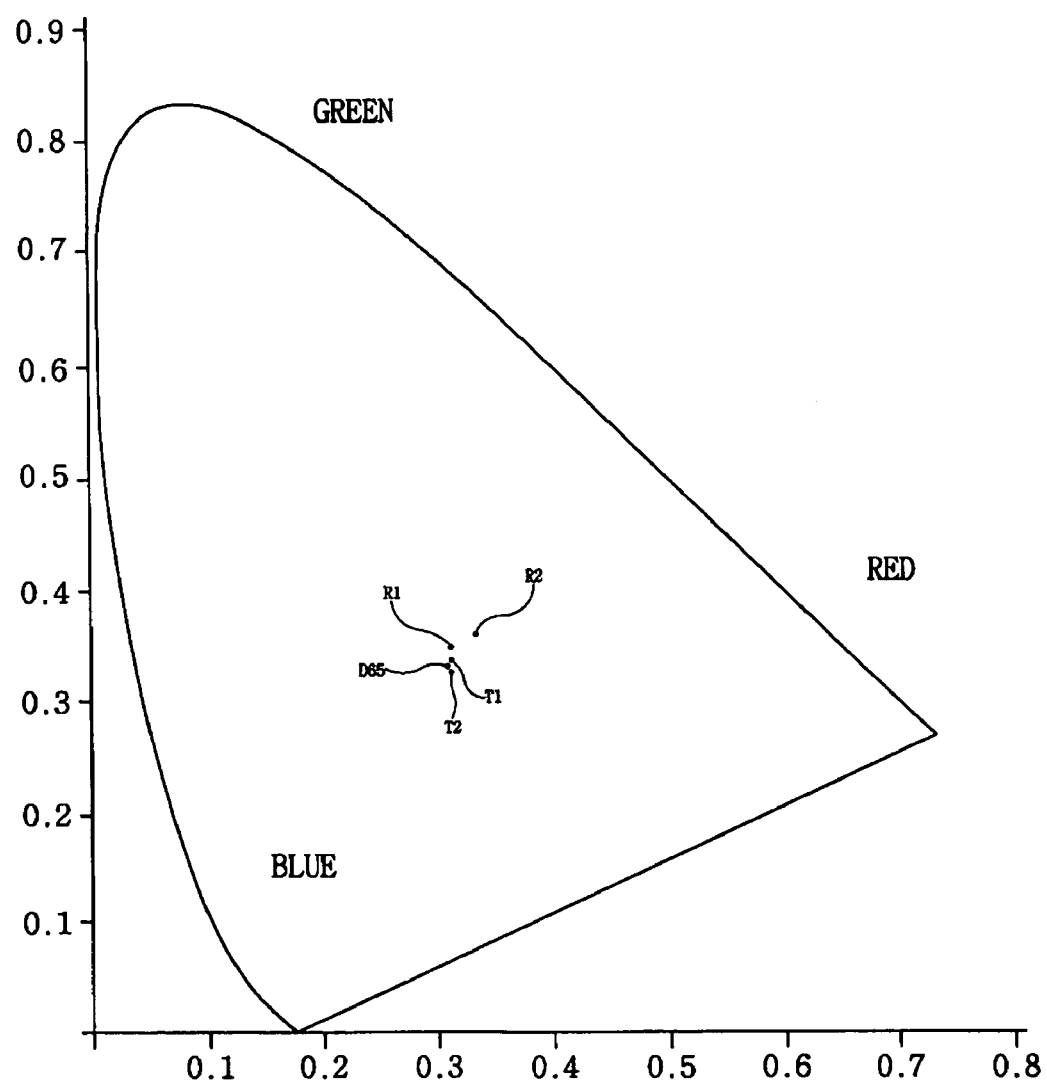
FIG. 11 is a graph color coordinates corresponding to white.

FIG. 11 is a graph showing color coordinates corresponding to white in a reflective region and a transmissive region. The color temperature for the sunlight D65 is 6500K. The 'x' and 'y' of color coordinates corresponding to the sunlight are 0.31 and 0.329, respectively. The 'x' and 'y' of color coordinates corresponding to white R1 from the reflective region of the vertically aligned LCD are 0.3161 and 0.3502, respectively. The 'x' and 'y' of color coordinates corresponding to white R2 from the reflective region of the homogeneously aligned LCD apparatus are 0.3286 and 0.3625, respectively. Thus, white R1 is closer to the sunlight D65 than the white color R2.

Table 2 shows comparison between the homogeneously aligned LCD and the LCD of the present invention in optical characteristics of the transmissive regions (the cell-gap of homogeneously aligned LCD is about 3.3 μm).

TABLE 2

| Transmissive Mode | | | | | |
|---|---|---|---|---|---|
| White | Black | Contrast | Color Coordinates | | |
| (Cd/m$^2$) | (Cd/m$^2$) | Ratio | X | Y | Liquid Crystal Layer |
| 141 | 0.716 | 198 | 0.3112 | 0.3289 | Homogeneously Aligned |
| 135 | 0.28 | 482 | 0.3113 | 0.3331 | Vertically Aligned |

Here, 'White (Cd/m$^2$)' refers to light intensity while displaying white, and 'Black (Cd/m$^2$)' refers to light intensity while displaying black. The contrast ratio equals 'White (Cd/m$^2$)' divided by 'Black (Cd/m$^2$)'. The contrast ratio of the vertically aligned LCD is 482, and the contrast ratio of the homogeneously aligned LCD is 198. The vertically aligned LCD shows improvement in contrast ratio over the homogeneously aligned LCD by 143%.

Back to FIG. 11, the color coordinates 'x' and 'y' corresponding to white T1 from the transmissive region of the vertically aligned LCD are 0.3113 and 0.3331, respectively. The color coordinates 'x' and 'y' corresponding to white T2 from the transmissive region of the homogeneously aligned LCD are 0.3112 and 0.3289, respectively. Therefore, white T1 of the vertically aligned LCD is substantially equal to white T2 of the homogeneously aligned LCD.

Figure 12:
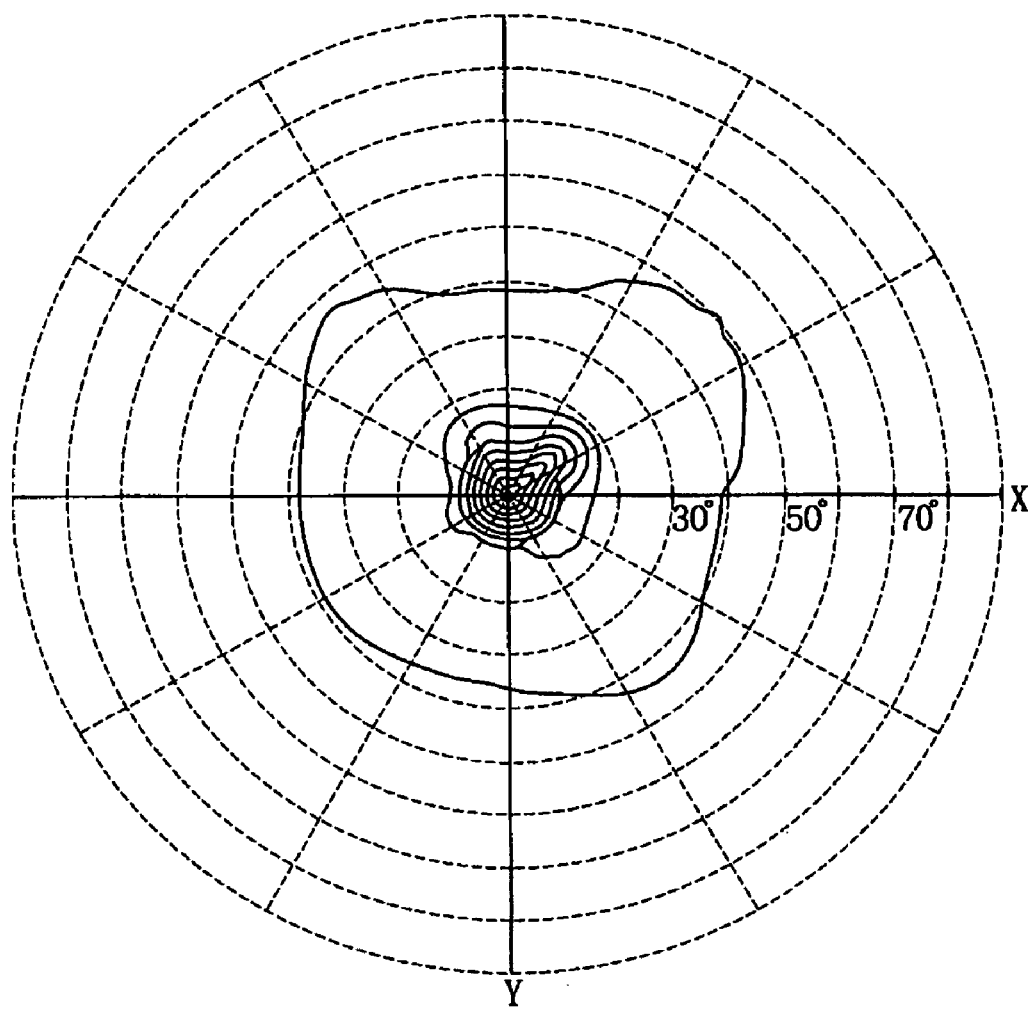
FIG. 12 is a graph showing a contrast ratio in response to a viewing angle according to a numerical analysis.
Figure 13:
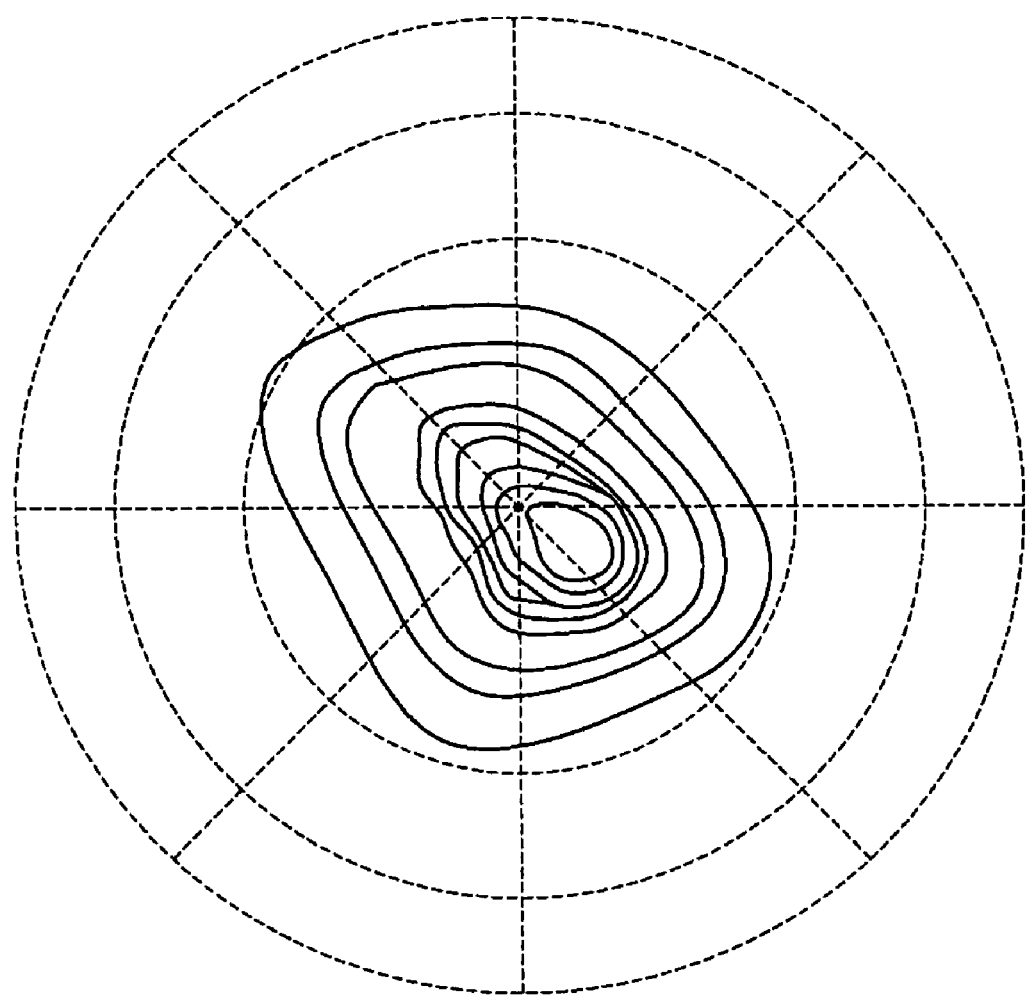
FIG. 13 is a graph showing a contrast ratio in response to a viewing angle according to the embodiments of the invention.

FIG. 12 is a graph showing a contrast ratio of a transmissive region in response to a viewing angle according to a numerical analysis. FIG. 13 is a graph showing a contrast ratio of the transmissive region in response to a viewing angle according to the present invention. The radial axis represents a viewing angle according to this embodiment, and the angular axis represents angular direction of a viewpoint. Contour lines correspond to contrast ratios in an interval of 10:1. As shown therein, the viewing angle of the LCD according to the present invention was about ±40 degree. Therefore, the viewing angle exhibiting good display qualities was about 80 degree.

As explained above, according to the present invention, the optical conditions (e.g., optical film assemblies and cell-gaps for the reflective and transmissive regions) of the vertically aligned LCD are optimized by improving transmittance and contrast ratio. In addition, the slow axis of the λ/4 retardation film, the slow axis of the λ/2 retardation film and the absorption axis of the polarizer are substantially perpendicular to the slow axis of the additional λ/4 retardation film, the slow axis of the additional λ/2 retardation film and the absorption axis of the additional polarizer, respectively, thereby simplifying the optical film assembly structure. Furthermore, the cell-gap of the reflective region is greater than that of the homogeneously aligned LCD.

It will be apparent to those skilled in the art that various modifications and variation can be made in the present invention without departing from the spirit or scope of the invention. Thus, it is intended that the invention cover the modifications and variations of this invention provided they come within the scope of the appended claims and their equivalents.

What is claimed is:

1. A liquid crystal display (LCD) having a reflective region and a transmissive region, comprising:
    a first substrate having an upper surface and a lower surface;
    a second substrate having an upper surface and a lower surface and facing the first substrate;
    a cell formed between the upper surface of the first substrate and the lower surface of the second substrate, the cell having a plurality cell-gaps;
    a vertically aligned liquid crystal layer disposed in the cell, wherein the reflective region has a first cell-gap ranging from about 1.8 μm to about 2.2 μm, and the transmissive region has a second cell-gap ranging from about 3.6 μm to about 4.0 μm;
    a first optical film assembly disposed on the lower surface of the first substrate and comprising a first polarizer, a first λ/4 retardation film disposed on the lower surface of the first substrate, and a first λ/2 retardation film disposed on the first λ/4 retardation film; and
    a second optical film assembly disposed on the upper surface of the second substrate and comprising a second polarizer, a second λ/4 retardation film disposed on the upper surface of the second substrate and a second λ/2 retardation film disposed on the second λ/4 retardation film, wherein slow axes of the second λ/4 and λ/2 retardation films are slanted at angles that lie in same quadrant with respect to an absorption axis of the second polarizer, wherein a slow axis of the first λ/2 retardation film and the slow axis of the second λ/2 retardation film form an angle ranged from about 80° to about 100°, and wherein the LCD has a threshold voltage equal to or less than about 2.0 V and a saturation voltage equal to or less than about 4.4V.

2. The LCD of claim 1, wherein the first cell-gap is about 2 μm.

3. The LCD of claim 1, wherein the second cell-gap is about 3.8 μm.

4. The LCD of claim 1, wherein the threshold voltage is about 1.7 V.

5. The LCD of claim 1, wherein the saturation voltage is about 4.0 V.

6. The LCD of claim 1, wherein an absorption axis of the first polarizer is substantially perpendicular to that of the second polarizer.

7. The LCD of claim 1, wherein the first optical film assembly further comprises:
    the first polarizer disposed on the first λ/2 retardation film.

8. The LCD of claim 7, wherein the second optical film assembly further comprises:
    the second polarizer disposed on the second λ/2 retardation film.

9. The LCD of claim 1, wherein a slow axis of the second λ/4 retardation film is slanted at an angle of about 15° counterclockwise with respect to the absorption axis of the second polarizer.

10. The LCD of claim 1, wherein a slow axis of the second λ/2 retardation film is slanted at an angle of about 75° counterclockwise with respect to the absorption axis of the second polarizer.

11. The LCD of claim 1, wherein a slow axis of the first λ/4 retardation film and the slow axis of the second λ/4 retardation film form an angle ranged from about 80° to about 100°.

12. The LCD of claim 11, wherein the slow axis of the first λ/4 retardation film is substantially perpendicular to that of the second λ/4 retardation film.

13. The LCD of claim 1, wherein the slow axis of the first λ/2 retardation film is substantially perpendicular to that of the second λ/2 retardation film.

14. The LCD of claim 1, wherein the second optical film assembly further comprises a compensation film formed between the second substrate and the second λ/4 retardation film.

15. The LCD of claim 14, wherein the compensation film is an A-plate or a C-plate.

16. The LCD of claim 1, wherein the vertically aligned liquid crystal layer comprises liquid crystal having a pre-tilt angle equal to or greater than about 45°.

17. The LCD of claim 1, further comprising a backlight assembly disposed below the lower surface of the first substrate.

18. A liquid crystal display (LCD) having a reflective region and a transmissive region, comprising:
    a first substrate having an upper surface and a lower surface;
    a second substrate having an upper surface and a lower surface and facing the first substrate;
    a cell formed between the upper surface of the first substrate and the lower surface of the second substrate, the cell having a plurality cell-gaps;

a vertically aligned liquid crystal layer disposed in the cell, wherein the reflective region has a first cell-gap ranging from about 1.8 µm to about 2.2 µm, and the transmissive region has a second cell-gap ranging from about 3.6 µm to about 4.0 µm;

a first optical film assembly disposed on the lower surface of the first substrate and comprising a first polarizer, a first $\lambda/4$ retardation film disposed on the lower surface of the first substrate, and a first $\lambda/2$ retardation film disposed on the first $\lambda/4$ retardation film; and a second optical film assembly disposed on the upper surface of the second substrate and comprising a second polarizer, a second $\lambda/4$ retardation film disposed on the upper surface of the second substrate and a second $\lambda/2$ retardation film disposed on the second $\lambda/4$ retardation film, wherein:

a slow axis of the first $\lambda/4$ retardation film and a slow axis of the second $\lambda/4$ retardation film form an angle ranged from about 80° to about 100°, and a slow axis of the first $\lambda/2$ retardation film and a slow axis of the second $\lambda/2$ retardation film form an angle ranged from about 80° to about 100°, wherein the LCD has a threshold voltage equal to or less than about 2.0 V and a saturation voltage equal to or less than about 4.4V.

* * * * *